(12) United States Patent
Chen et al.

(10) Patent No.: US 7,523,643 B2
(45) Date of Patent: Apr. 28, 2009

(54) HUMIDITY SENSING STRUCTURE HAVING A CANTILEVER RESISTOR AND METHOD FOR FABRICATING THE SAME

(75) Inventors: Jung-Tai Chen, Hsinchu (TW); Chia-Yen Lee, Hsinchu (TW); Yii-Tay Chiou, Hsinchu (TW); Chun-Hsun Chu, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 292 days.

(21) Appl. No.: 11/647,216

(22) Filed: Dec. 29, 2006

(65) Prior Publication Data

US 2007/0188974 A1    Aug. 16, 2007

(30) Foreign Application Priority Data

Feb. 24, 2006   (TW) .............................. 95106230 A

(51) Int. Cl.
G01N 27/12 (2006.01)
G01N 7/00 (2006.01)
G01N 19/10 (2006.01)
H01C 17/06 (2006.01)

(52) U.S. Cl. .................. 73/29.01; 73/29.02; 73/335.05; 73/335.11; 73/335.13; 29/620

(58) Field of Classification Search ................ 73/29.01, 73/29.02, 335.01–335.05, 335.11–335.14; 29/620
See application file for complete search history.

(56) References Cited

U.S. PATENT DOCUMENTS

| 4,793,182 | A | * | 12/1988 | Djorup | 73/335.02 |
| 4,928,513 | A | | 5/1990 | Sugihara et al. | |
| 5,048,336 | A | * | 9/1991 | Sugihara et al. | 73/29.01 |
| 5,563,341 | A | * | 10/1996 | Fenner et al. | 73/335.11 |
| 7,373,819 | B2 | * | 5/2008 | Engler et al. | 73/335.03 |

* cited by examiner

*Primary Examiner*—Ramon M Barrera
(74) *Attorney, Agent, or Firm*—Birch, Stewart, Kolasch & Birch, LLP

(57) ABSTRACT

A humidity sensing structure having a cantilever resistor and a method for fabricating the same are disclosed. The method includes providing a substrate having a first surface and a second surface; performing an oxidation process on the first surface and the second surface to form a first oxide layer and a second oxide layer respectively; forming a resistance sensing layer on the first oxide layer; forming a humidity sensing layer on the resistance sensing layer; forming in the substrate a through-hole penetrating the first oxide layer and the second oxide layer; and forming a cantilever in the through-hole such that both the humidity sensing layer and the resistance sensing layer are secured in position on the cantilever. In response to humidity changes, the humidity sensing layer varies in volume and in consequence the resistance sensing layer varies in length, allowing ambient humidity to be measured.

15 Claims, 6 Drawing Sheets

HUMIDITY SENSING STRUCTURE HAVING A CANTILEVER RESISTOR AND METHOD FOR FABRICATING THE SAME

BACKGROUND OF THE INVENTION

1. Field of the Invention

This invention relates to humidity sensing devices, and more particularly, to a humidity sensing structure having a cantilever resistor and a method for fabricating the same.

2. Description of Related Art

In recent years, temperature/humidity sensing devices are not only designed to be readable, but they also work with other portable electronic devices such as a cellular phone and applications in a smart car for comfortable and safe driving. As regards environmental safety monitoring, a temperature/humidity sensing component is required to be highly sensitive and high response speed. However, no temperature/humidity sensing component presently available in the market is good enough to satisfy these two requirements.

There are four types of temperature/humidity sensing components in the market, namely integrated electrode (IDE), piezoresistive type, surface acoustic wave (SAW), and optic temperature/humidity sensing component. They have their own advantages, but they have some disadvantages in common, such as low sensitivity, poor stability, poor linearity, low response speed, and that it is hard to compensate a drift value due to variance of temperature. In order to solve the drawbacks of the prior art and satisfy the demand for compact, portable sensing modules and their integration with a system, an integrated humidity sensor is introduced to the market.

FIG. 1 shows a schematic diagram of a micro-sensor disclosed by Taiwanese Publication No. 200508590 "MICRO-SENSOR AND METHOD FOR FABRICATING THE SAME AND SENSING DEVICE HAVING THE MICRO-SENSOR". The micro-sensor comprises a first base 11 having a cantilever beam 110, a second base 12 opposite to the first base 11, a bridge board 13 installed on the first base 11 and the second base 12, a first electrode layer 14 formed on the bridge board 13, a humidity sensing layer 15 formed on the first electrode layer 14, a groove 130 formed on a bottom portion of the bridge 13, and a second electrode layer 16 formed in the groove 130 and corresponding in position to the first electrode layer 14. The first electrode layer 14 combines with the second electrode layer 16 to form a capacitor.

The humidity sensing layer 15 contracts or elongates, depending on humidity and the corresponding amount of water it absorbs. In consequence, the cantilever beam 110 bends to different degrees. A resultant change in the distance between the first electrode layer 14 and the second electrode layer 16 causes the capacitance of the capacitor to change. The aforesaid mechanism can be applied to the measurement of ambient humidity.

A method for fabricating the micro-sensor is described in FIGS. 2A to 2G. As shown in FIG. 2A, the method involves providing a substrate 10 having two mask layers 101 formed on a top surface and a bottom surface of the substrate 10. As shown in FIG. 2B, the method involves depositing the first electrode layer 14 on the mask layer 101 formed on the top surface of the substrate 10. As shown in FIG. 2C, the method involves forming the humidity sensing layer 15 on the first electrode layer 14. As shown in FIG. 2D, the method involves etching the mask layers 101 formed on the top and bottom surfaces of the substrate 10 to form two notches 102 and 103 respectively. As shown in FIG. 2E, through the notches 102 and 103, the substrate 10 is etched so as to form the first and second bases 11 and 12 and form the cantilever beam 110 on the first base 11. As shown in FIG. 2F, the method involves depositing metal in the groove 130 of the bridge board 13 to form the second electrode layer 16. As shown in FIG. 2G, the method involves connecting the groove 130 of the bridge board 13 to the first and second bases 11 and 12 such that the groove 130 faces downward and abuts against the first and second bases 11 and 12, to ensure that the second electrode layer 16 in the groove 130 is corresponding in position to the first electrode layer 14 on the cantilever beam 110, so as to form a capacitor required for the micro-sensor.

However, the micro-sensor is formed by stacking the first electrode layer 14 above the cantilever beam 110, which is movable, on the second electrode layer 16 below the bridge board 13, which is unmovable, the formation of the first and second electrode layers 14 and 16 and the stacking of the first electrode layer 14 on the second electrode layer 16 include three individual fabricating processes, and thus the micro-sensor of the prior art has a complicated fabricating process and a high fabricating cost.

Therefore, an existing issue which needs urgent resolution is about providing a micro-sensor having a simplified fabricating process and a low fabricating cost, but still having the original sensing characteristics.

SUMMARY OF THE INVENTION

In views of the above-mentioned drawbacks of the prior art, it is a primary objective of the present invention to provide a humidity sensing structure having a cantilever resistor and a method for fabricating the same, so as to simplify the structure and reduce the complexity of a fabricating process.

It is another objective of the present invention to provide a humidity sensing structure having a cantilever resistor and a method for fabricating the same, so as to increase the yield and improve the quality of sensing humidity.

To achieve the above-mentioned and other objectives, a method for fabricating a humidity sensing structure having a cantilever resistor is provided according to the present invention. The method includes providing a substrate made of a semiconductor material and having a first surface and a second surface; performing an oxidation process on the first surface and the second surface to form a first oxide layer and a second oxide layer respectively; forming a resistance sensing layer on the first oxide layer; forming a humidity sensing layer on the resistance sensing layer; and forming in the substrate a through-hole penetrating the first oxide layer and the second oxide layer, and forming a cantilever in the through-hole, such that both the humidity sensing layer and the resistance sensing layer are secured in position on the cantilever.

Before forming the through-hole in the substrate, two holes are formed in the first and second oxide layers respectively, and then the through-hole is formed in the semiconductor material layer lying between the first and second oxide layers. Afterward, the cantilever is formed in the through-hole such that both the humidity sensing layer and the resistance sensing layer are secured in position on the cantilever.

The present invention further provides a humidity sensing structure having a cantilever resistor. The structure includes a substrate having a first surface and a second surface, a first oxide layer and a second oxide layer formed on the first and second surfaces of the substrate respectively by an oxidation process, a through-hole penetrating the first and second oxide layers, a cantilever formed in the through-hole, a resistance sensing layer formed on the cantilever, and a humidity sensing layer formed on the resistance sensing layer such that the humidity sensing layer is superimposed on the resistance sensing layer and disposed in the through-hole by means of the cantilever.

The resistance sensing layer is made of a material whose resistance varies with length, for example, platinum. The resistance sensing layer comprises a pattern capable of enhancing sensing characteristics or reducing a temperature effect. The humidity sensing layer is made of a material whose volume varies with humidity, such as porous porcelain, organic material, and organic polymer.

In response to ambient humidity changes, the humidity sensing layer varies in volume, that is, it expands or contracts, and then the resistance sensing layer and the cantilever bend upward or downward, leading to variation in the length of the resistance sensing layer which, in turn, causes the resistance of the resistance sensing layer to change. Accordingly, humidity changes can be measured by resistance to humidity conversion.

As mentioned above, the resistance sensing layer whose resistance varies with length is formed on the cantilever disposed in the through-hole, whereas in response to ambient humidity changes the humidity sensing layer varies in volume and thereby causes the resistance sensing layer to vary in length. As a result, it is feasible to perform resistance to humidity conversion and thereby streamlines the structure. Accordingly, the present invention solves the drawbacks, namely the complicate structure and high cost which may otherwise be the case because conventional capacitor-based sensing necessitates using two opposing electrode layers.

The method involves forming the resistance sensing layer and the humidity sensing layer directly on the first oxide layer, forming the cantilever in the through-hole of the substrate, and securing in position the resistance sensing layer and the humidity sensing layer on the cantilever, so as to form a structure for sensing ambient humidity. Hence, the process is all-in-one, simple, high-yield, and low-cost, as it solves the drawbacks of the prior art, that is, a conventional capacitor-based structure typically comprises two opposing electrode layers and one bridge structure, which are fabricated by three different fabricating processes.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those skilled in the art after reading the disclosure of this specification. The present invention can also be performed or applied by other different embodiments. The details of the specification may be modified on the basis of different points and applications, and numerous modifications and variations can be devised without departing from the spirit of the present invention.

FIGS. 3A to 3E demonstrate a method for fabricating a humidity sensing structure having a cantilever resistor of the present invention.

Figure 1:
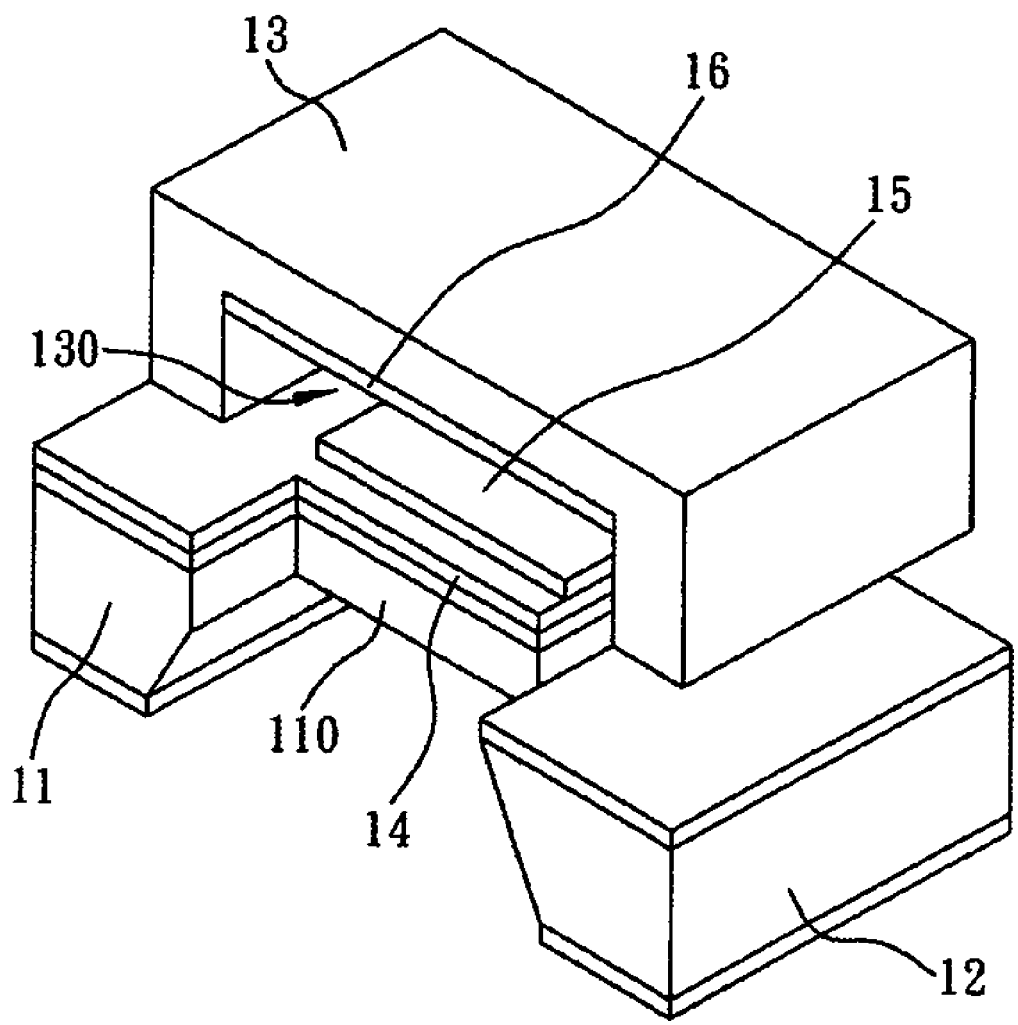
FIG. 1 is a perspective view of Taiwanese Publication No. 200508590.
Figure 2A:
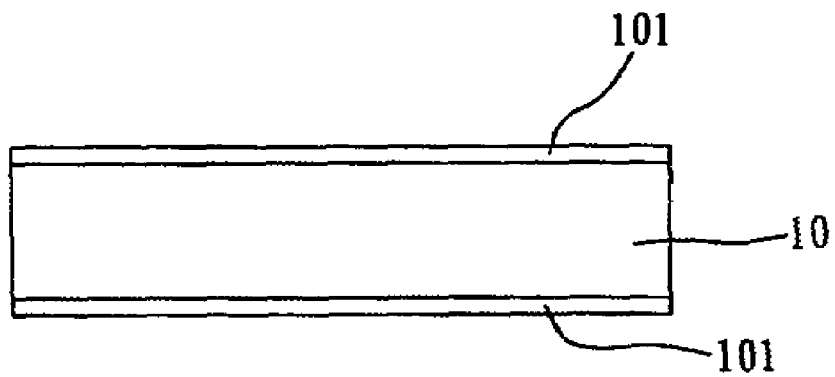
FIGS. 2A to 2G are flow charts demonstrating a method for fabricating Taiwanese Publication No. 200508590.
Figure 2B:
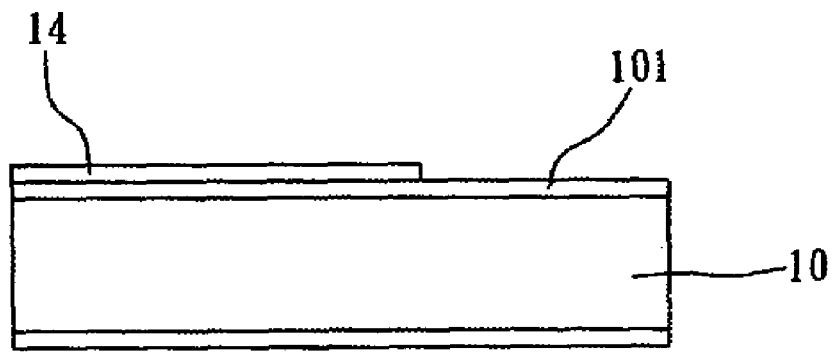
Figure 2C:
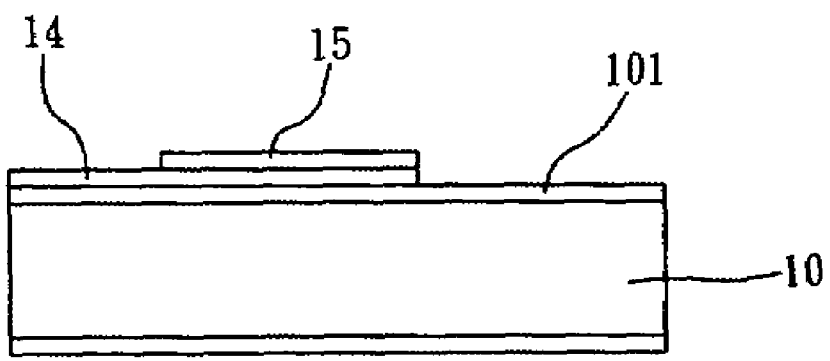
Figure 2D:
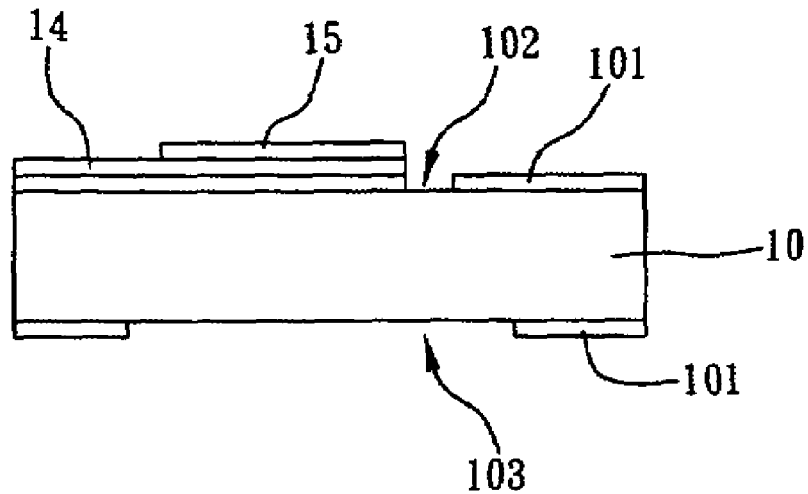
Figure 2E:
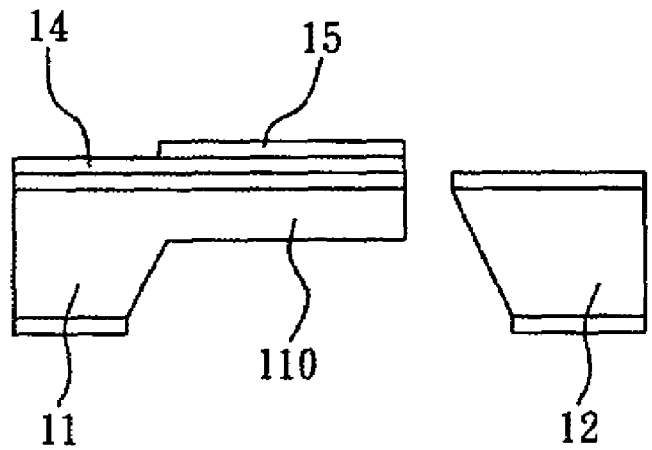
Figure 2F:
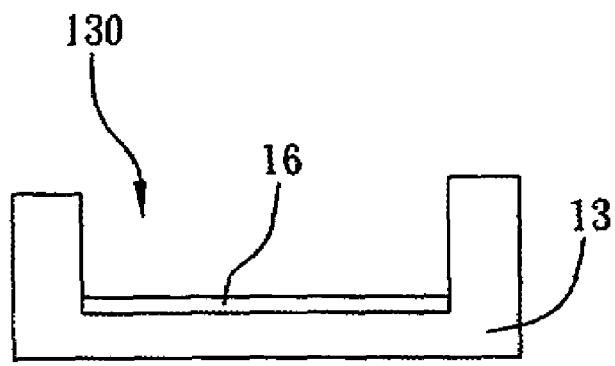
Figure 2G:
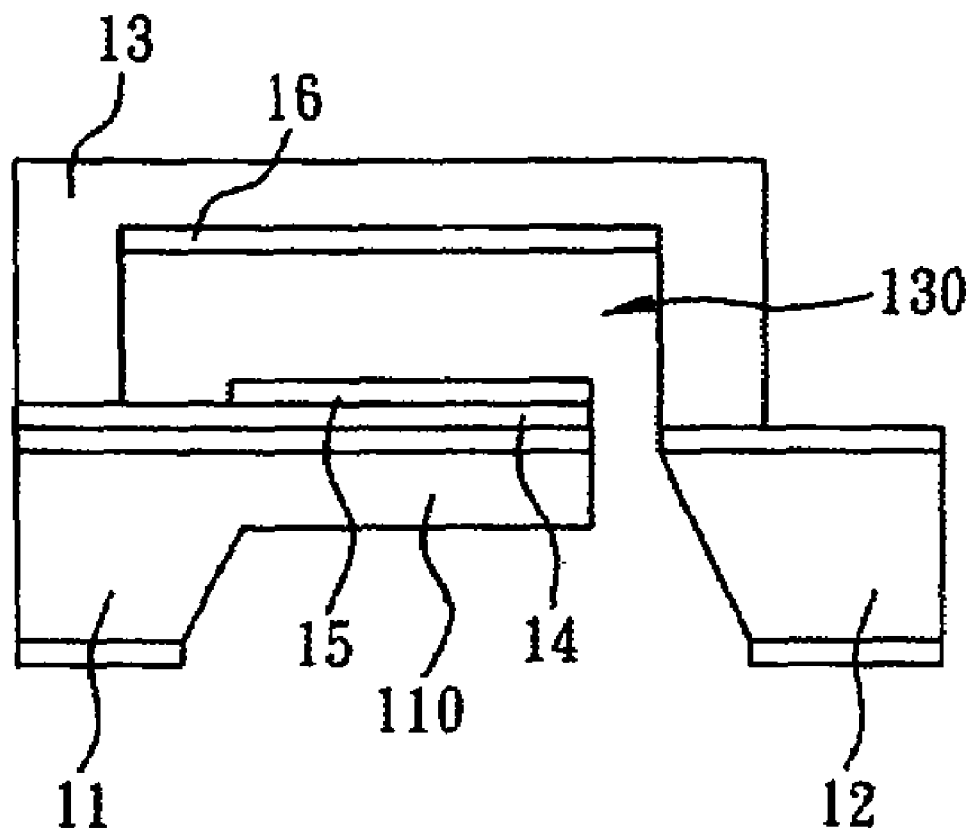
Figure 3A:
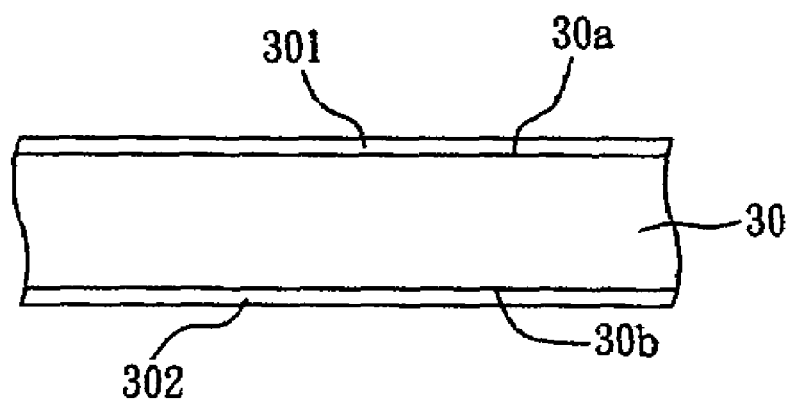
FIGS. 3A to 3E are flow charts demonstrating a method for fabricating a humidity sensing structure having a cantilever resistor of the present invention.

Referring to FIG. 3A, the method involves providing a substrate 30 such as a semiconductor material layer. The substrate 30 comprises a first surface 30a and a second surface 30b, both of which are processed by an oxidation process to form a first oxide layer 301 and a second oxide layer 302 respectively.

Figure 3B:
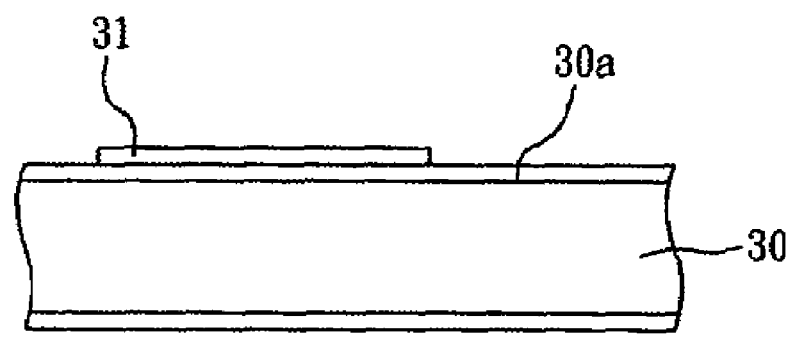

Referring to FIG. 3B, the method involves forming a resistance sensing layer 31 on the first surface 30a. The resistance sensing layer 31 is made of a material whose resistance varies with length, for example, platinum. The resistance sensing layer 31 comprises a pattern capable of enhancing sensing characteristics or reducing a temperature effect.

Figure 3C:
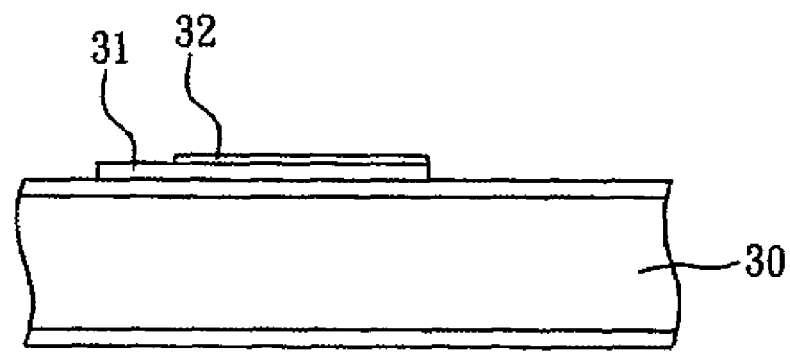

Referring to FIG. 3C, the method involves forming a humidity sensing layer 32 on the resistance sensing layer 31. The humidity sensing layer 32 is made of a material whose shape varies with humidity, for example, porous porcelain, organic material, and organic polymer.

Figure 3D:
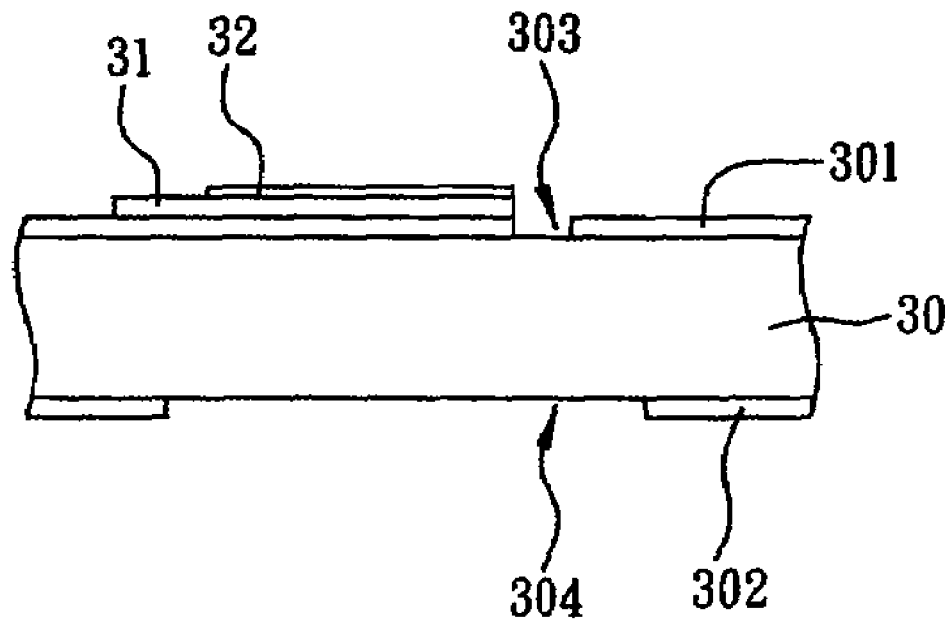

Referring to FIG. 3D, the method further involves forming holes 303 and 304 in the first oxide layer 301 and the second oxide layer 302 respectively, so as to expose the semiconductor material layer between the first oxide layer 301 and the second oxide layer 302.

Figure 3E:
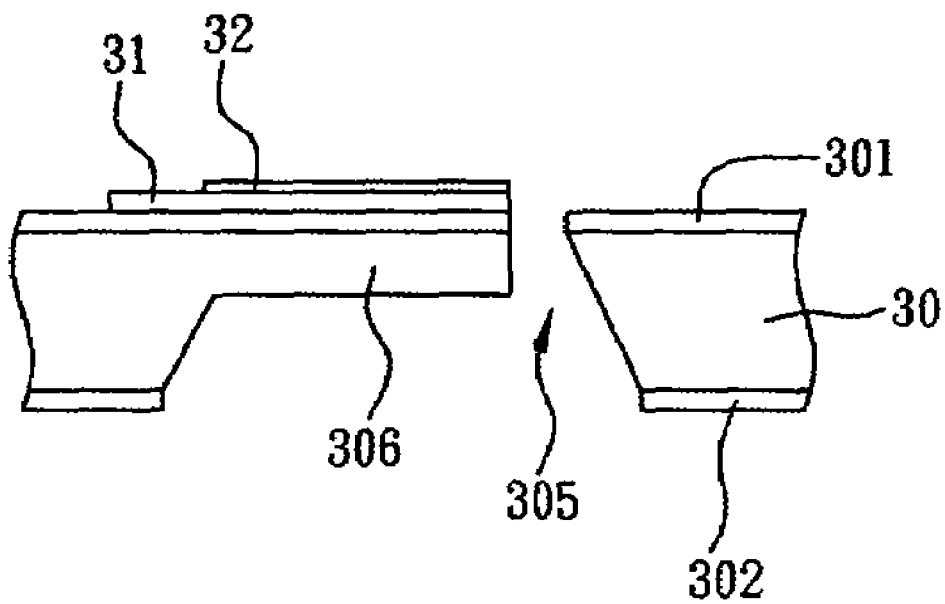

Referring to FIG. 3E, the method adopts an etching technique to form a through-hole 305 penetrating the first and second surfaces 30a and 30b, and form a cantilever 306 under the resistance sensing layer 31, so as to form in the through-hole 305 a three-layered cantilever structure including the cantilever 306, the resistance sensing layer 31 and the humidity sensing layer 32.

The method provides a resistor-based sensing structure by the steps of forming the resistance sensing layer 31 and the humidity sensing layer 32 directly on the first oxide layer 301, forming the through-hole 305 in the substrate 30, and forming the cantilever 306 in the through-hole 305 and below the resistance sensing layer 31. Accordingly, the present invention overcomes the drawbacks of the prior art, that is, a conventional capacitive structure typically comprises two opposing electrode layers and one bridge structure, which are fabricated by three different fabricating processes. Therefore, the present invention provides a simple humidity sensing structure and a simplified high-yield process.

Referring to FIG. 3E, with the aforesaid method, the present invention further provides a humidity sensing structure having a cantilever resistor. The humidity sensing structure comprises the substrate 30 having the first surface 30a and the second surface 30b. The first and second surfaces 30a and 30b are processed by the oxidation process to form the first oxide layer 301 and the second oxide layer 302 respectively. The substrate 30 comprises the through-hole 305 penetrating the first and second oxide layers 301 and 302. The humidity sensing structure further comprises the cantilever 306, the resistance sensing layer 31 formed on the cantilever 306, and the humidity sensing layer 32 formed on the resistance sensing layer 31.

Installed on the resistance sensing layer 31 is the humidity sensing layer 32 whose volume varies with humidity. In response to humidity changes, the humidity sensing layer 32 expands or contracts and thus the cantilever 306 bends upward or downward, causing the length of the resistance sensing layer 31 to change. Accordingly, humidity can be read by converting the resistance of the resistance sensing layer 31 to humidity.

In summary, the method for fabricating a humidity sensing structure having a cantilever resistor in accordance with the present invention involves forming the resistance sensing layer and the humidity sensing layer directly on the first oxide layer of the substrate, forming the through-hole in the substrate, forming the cantilever in the through-hole such that both the resistance sensing layer and the humidity sensing layer are secured in position on the cantilever, with a view to forming a structure for sensing ambient humidity. Hence, the process is all-in-one, simple, high-yield, and low-cost, as it solves the drawbacks of the prior art, that is, a conventional capacitor-based structure has to be otherwise connected to a bridge structure and thus the fabrication process becomes complicated.

The humidity sensing structure having a cantilever resistor in accordance with the present invention comprises the resistance sensing layer and the humidity sensing layer. The resistance sensing layer, whose resistance varies with length, is disposed on the cantilever in the through-hole. The humidity sensing layer varies in volume in response to ambient humidity changes, causing the cantilever to bend. As a result, the resistance sensing layer varies in length. This allows the resistance of the resistance sensing layer 31 to be converted to humidity. Accordingly, the present invention provides a simple humidity sensing structure and solves the drawbacks of the prior art, that is, a conventional capacitive structure typically comprises two opposing electrode layers and thus the fabrication process becomes complicated.

The foregoing descriptions of the illustrative embodiments are only given to disclose the features and functions of the present invention but not to limit the scope of the present invention. It should be apparent to those skilled in the art that all modifications and variations devised according to the spirit and principle of the present invention should fall within the scope of the appended claims.

What is claimed is:

1. A method for fabricating a humidity sensing structure having a cantilever resistor, the method comprising:
   providing a substrate having a first surface and a second surface;
   performing an oxidation process on the first surface and the second surface to form a first oxide layer and a second oxide layer respectively;
   forming a resistance sensing layer on the first oxide layer;
   forming a humidity sensing layer on the resistance sensing layer; and
   forming in the substrate a through-hole penetrating the first oxide layer and the second oxide layer respectively, and forming a cantilever in the through-hole, to secure in position the humidity sensing layer and the resistance sensing layer on the cantilever.

2. The method of claim 1, wherein the substrate is a semiconductor material layer.

3. The method of claim 2, wherein before forming the cantilever in the through-hole, two holes are formed in the first and second oxide layers respectively, and then the through-hole is formed in the semiconductor material layer between the first oxide layer and the second oxide layer.

4. The method of claim 1, wherein the resistance sensing layer is made of a material whose resistance varies with length.

5. The method of claim 1, wherein the resistance sensing layer comprises a pattern capable of enhancing sensing characteristics or reducing a temperature effect.

6. The method of claim 1, wherein the resistance sensing layer is made of platinum.

7. The method of claim 1, wherein the humidity sensing layer is made of a material whose volume varies with humidity.

8. The method of claim 1, wherein the humidity sensing layer is one selected from the group consisting of porous porcelain, organic material, and organic polymer.

9. A humidity sensing structure having a cantilever resistor, the structure comprising:
   a substrate having a first surface and a second surface;
   a first oxide layer and a second oxide layer formed by an oxidation process performed on the first surface and the second surface;
   a through-hole penetrating the first and second oxide layers;
   a cantilever formed in the through-hole;
   a resistance sensing layer formed on the cantilever; and
   a humidity sensing layer formed on the resistance sensing layer.

10. The structure of claim 9, wherein the substrate is a semiconductor material layer.

11. The structure of claim 9, wherein the resistance sensing layer is made of a material whose resistance varies with length.

12. The structure of claim 9, wherein the resistance sensing layer comprises a pattern capable of enhancing sensing characteristics or reducing a temperature effect.

13. The structure of claim 9, wherein the resistance sensing layer is made of platinum.

14. The structure of claim 9, wherein the humidity sensing layer is made of a material whose volume varies with humidity.

15. The structure of claim 9, wherein the humidity sensing layer is one selected from the group consisting of porous porcelain, organic material, and organic polymer.

* * * * *